United States Patent [19]

Crawford

[11] Patent Number: 4,776,798
[45] Date of Patent: Oct. 11, 1988

[54] ENERGY MANAGMENT MICROPROCESSING TRAINING SYSTEM PROVIDING INSTRUCTION FOR THE PROGRAMMING AND COMPUTERIZATION OF MECHANICAL AND ELECTRICAL CONTROL SYSTEMS, ADAPTED TO BE A COMPONENT WITH AND AN IMPROVEMENT FOR EXISTING CHANGEABLE MODULAR TRAINING SYSTEMS

[75] Inventor: Larry C. Crawford, Redmond, Wash.
[73] Assignee: Training Labs Inc., Redmond, Wash.
[21] Appl. No.: 805,626
[22] Filed: Dec. 6, 1985
[51] Int. Cl.⁴ .............................................. G09B 9/00
[52] U.S. Cl. ................................... 434/224; 434/366; 434/379; 434/380
[58] Field of Search ................. 434/224, 366, 379, 380

[56] References Cited

U.S. PATENT DOCUMENTS 3,540,135  11/1970  Alcosser et al. ..................... 434/224
4,316,720  2/1982  Ackerman ........................... 434/224

FOREIGN PATENT DOCUMENTS

1143937  4/1983  Canada ................................ 434/224

Primary Examiner—Leo P. Picard
Attorney, Agent, or Firm—Roy E. Mattern, Jr.

[57] ABSTRACT

The changeable modular training system disclosed in U.S. Pat. No. 4,623,312 is extended to include an energy management microprocessing unit, i.e. CPU, a keyboard, a video screen, a remote sensor, and a microprocessing interface unit, to create an energy management microprocessing training system. These added components are formed in the same size modules and/or are interconnected, where needed, by the same electrical connectors and the same peg and slot supports as used in the changeable modular training system. This energy management microprocessing training system is used when students are taught how to program, operate, install, service, and troubleshoot mechanical and electronic control systems in a classroom, when using simulated control systems.

1 Claim, 7 Drawing Sheets

ENERGY MANAGMENT MICROPROCESSING TRAINING SYSTEM PROVIDING INSTRUCTION FOR THE PROGRAMMING AND COMPUTERIZATION OF MECHANICAL AND ELECTRICAL CONTROL SYSTEMS, ADAPTED TO BE A COMPONENT WITH AND AN IMPROVEMENT FOR EXISTING CHANGEABLE MODULAR TRAINING SYSTEMS

BACKGROUND OF THE INVENTION

A variety of training apparatuses and instructional equipment has been developed for mechanical and electrical systems. Many of these training apparatuses involve the use of equipment which can be used for testing circuits, for example, or educating the student in basic electrical wiring.

Present Applicant, Larry C. Crawford has developed a modular training system for instruction concerning electro-mechanical control systems in his copending U.S. application Ser. No. 666,977, now U.S. Pat. No. 4,623,312. The interchangeable modules comprising this system form the basis for the present invention. Other developments in the area of electro-mechanical training equipment are described below.

Ackerman, U.S. Pat. No. 4,316,720 has developed a maintenance training device which allows students to learn hands on maintenance and training of electronic systems using simulated components.

Schager, U.S. Pat. No. 3,237,318 presents an apparatus for simulating the operation of an electrical power plant. The equipment used in the Schager invention show the student actual components of a generating plant so as to be able to follow the sequence of operation of the system.

The majority of the training systems do not permit the student to experience working with a basic electro-mechanical system which may be modified to provide a more complex system than may be encountered at a job site.

Apparatuses, such as that of the Schager invention, utilize large pieces of equipment which are fixed in position and may not be modified to represent different electro-mechanical systems.

Other teaching and testing devices have been developed such as that of Gudelis et al., U.S. Pat. No. 4,213,253; Wahl et al., U.S. Pat. No. 4,198,768; and Hill et al., U.S. Pat. No. 4,112,593.

This latter invention of Hill's is used for the construction as well as testing of electrical circuits.

Other training aids have been developed which utilized removable electrical components including that of Alcosser, U.S. Pat. No. 3,540,135 (1970). Alcosser's Educational Training Aid discloses a circuit board containing removable electrical logic modules which when wired to the circuit board properly helps students develop the fundamentals of Boolean algebra. Boissonneault in Canadian Pat. No. 1,143,936 discloses a training device which permits electrical components to be movably interchanged and secured to a panel to teach the fundamentals of electrical circuits.

Within the electrical and mechanical systems fields, there has remained a need to provide a portable training system which would allow the students to interchangeably construct and troubleshoot an actual control system which could be done in a classroom setting. More importantly with respect to the present application, there has remained a need to provide a training apparatus to teach students about the computerization or computerized control of the heating, cooling, ventilation or other electro-mechanical control systems. Technicians and engineers learning about modern environmental or energy systems must also learn how computers are used as an essential component in these various control systems and must learn the programming and operational functions thereof.

Another important need of teaching the operation and troubleshooting of electro-mechanical systems is the need to have that system be adaptable for the increase of complexity and vary according to the capabilities of the system for more advanced students.

The present invention serves to meet these needs by establishing a programmable modular training system which provides students at all levels with the ability to experience hands on training of actual working control systems at the programming, operation and troubleshooting levels.

CROSS-REFERENCE

This application refers to the specification and drawings of the co-pending application, which is incorporated herein by this reference, Ser. No. 666,977, Applicant Larry C. Crawford, filed 10/31/84, entitled "A Changeable Modular Training System to Provide Instruction for Installing, Servicing, Troubleshooting and Operating Electro-mechanical Control Systems", now U.S. Pat. No. 4,623,312.

SUMMARY OF THE INVENTION

An energy management microprocessing system designed as a component of and for the computerization of a changeable modular electrical control training system, to provide hands on instruction in the programming, operation, installation, servicing and troubleshooting of electrical control systems. The microprocessing system broadly comprises a central processing unit or CPU, a screen, a keyboard and a plurality of electro-mechanical cubes which represent and simulate electro-mechanical elements of a typical heating, cooling, ventilation or other control system. The cubes broadly comprise remote sensor cubes, interface relay cubes and other cubes wich include simulators, controllers and source cubes representing components of an on site control system. The CPU, screen and cubes are all adapted for removable attachment to a hollow structural power base. The CPU, screen and cubes are arranged in a building block structure allowing versatility in teaching control system sequence wiring. The CPU comprises a small personal computer which accepts standard floppy disk programs in a dual disk drive arrangement. The entire modular training system thus simulates a computerized environmental control system that would be found in the working environment, allowing the instructor to teach skills and programming and understanding the interface of computerization with the standard electrical and mechanical operation of thermostats, heaters, fans and other equipment in a control system.

Each of the cubes includes conventional electrical mechanical components to function similarly to the systems encountered at the job site. Wiring inside the cubes is adapted to establish indicator light power circuitry and control system circuitry. Different arrangements of cubes provide the student with training in developing and operating different kinds of control systems. The control system circuitry is completed by the student using patch cords to externally connect the cubes with each other as well as to connect the remote sensor cube with the CPU and the interface relay cube with the CPU as well as with other electro-mechanical cubes.

Remote sensor cubes are used to simulate the input of analog data to the CPU through sensor input jacks on the CPU. The analog data is analyzed and read by the computer and the software program will determine the appropriate output signal to a particular control function. Each of the output channels of the CPU is connected to an interface relay cube whereby the output DC signal is used as a switching means to control the AC operated control system component.

Faults or failures may also be entered into the control system circuitry by the instructor through one or more switches on the back of each cube. Faults or failures may also be programmed into the software which regulates the sequence of events of operation in the modular training system. Activating internal control switches on the panel of the CPU will enter the preprogrammed fault into the computer program.

External switches on the CPU simulate the use of external switching means or entry of digital data into the system to alter the normal course or operation of the software program.

The student must use a process of elimination as well as conventional testing means to determine whether faults encountered are based upon failures in the electro-mechanical cubes, specifically faults in the remote sensor cubes, failures in the DC circuitry of the interface relay cubes or whether the problem is related to software or the computer hardware.

DESCRIPTION OF THE PREFERRED EMBODIMENTS

Introduction

Figures 1, 2:
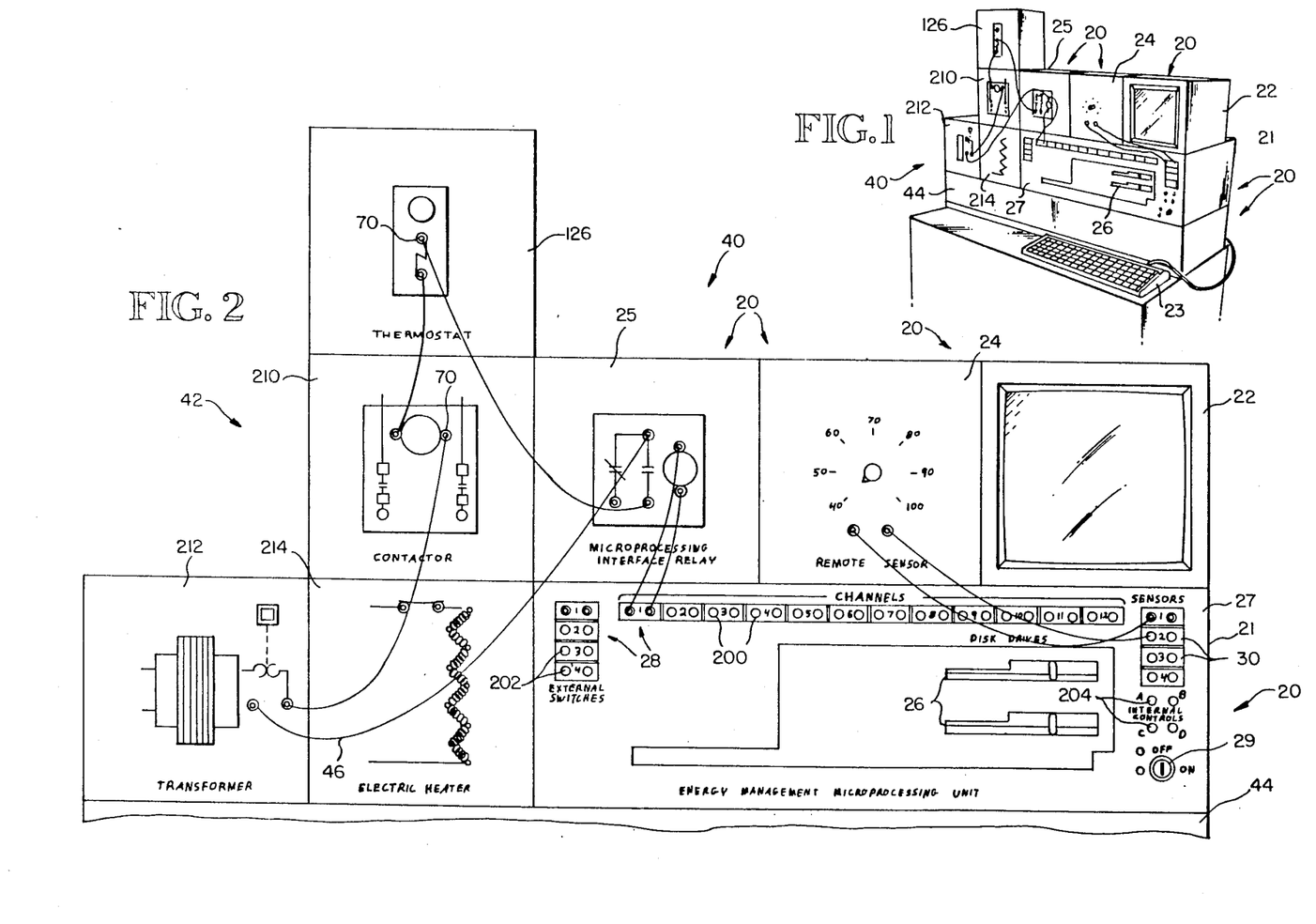
FIG. 1 is a perspective view of the modular training system including the microprocessing system.
FIG. 2 is an enlarged front view of the microprocessing system in use with additional electromechanical cubes.

An energy management microprocessing training system 20 used to interface computerized control with new or existing electro-mechanical systems, such as cooling, heating, or ventilation systems typically found in a field environment. The energy management microprocessing training system 20 or microprocessing system 20 is designed to be used in a laboratory or teaching environment generally and specifically to be used with a changeable modular electrical control training system 40 as outlined in copending U.S. patent application Ser. No. 666,977 filed by the present Applicant Larry C. Crawford, now U.S. Pat. No. 4,623,312. The microprocessing system 20 actually is designed to function as an improvement for and component of a modular training system 40 designed to train students, technicians or engineers in the programming, operation, installation, servicing and troubleshooting of control systems used with various kinds of machinery or with refrigeration, heating or ventilation systems or the like. As shown in FIG. 1 of the drawings, the improved modular training system 40 incorporates a central processing unit 21 or CPU 21, a screen 22 and a keyboard 23 as well as a plurality of hollow structural electro-mechanicl cubes 42. Those cubes 42 are further broadly classified according to those relating specifically to the computerization of the control system and those which are non CPU related and which further simulate other components of the control systems such as a fan or heater, transformer, thermostat or solenoid valve. These non CPU related electro-mechanical cubes will be discussed in the specification in due course. Of primary importance to the present invention, however, are the CPU related cubes including remote sensor cubes 24 and the interface relay cubes 25 which are required for the CPU 21 to interface the computerization aspects with the mechanical and electrical functions of modular training system 40.

The components of the microprocessing system 20, including the CPU 21, screen 22, keyboard 23, remote sensor cubes 24 and interface relay cubes 25, are designed to provide digital control of the electro-mechanical control systems and thereby function as components of the modular training system 40. The microprocessing system, however, may function as a self contained learning system for students to learn about the programming and operation of computerized systems as they function in combination with a heating, cooling, ventilation or other control system typically found in the working environment. The addition of other electromechanical cubes 42 allows the students to put their computerized programs into effect and see how the overall control systems operate on a computerized basis and how energy management is achieved when the various control system components are regulated and operated by preselected programming techniques.

The microprocessing system 20 components will be discussed first and their relationship to the overall modular training system 40 and specifics regarding the additional cube 42 will be referenced later.

The Microprocessing System Broadly Comprises Components of a Personal Computer and a Plurality of Electro-Mechanical Cubes Including Remote Sensor Cubes and Interface Relay Cubes The computerization of the training system is primarily achieved through the use of three components, a central processing unit or CPU 21, a keyboard 23 and a screen 22. The two disk drives 26 of the CPU 21 accept new or existing software designed to teach students, technicians or engineers various aspects of programming and the computerization of environmental control systems, such as heating, cooling or ventilation systems.

An interface relay cube 25 is used as a switching means for the computer's DC (direct current) power thereby interfacing the AC (alternating current) requirements of components in the heating or cooling control systems.

Remote sensor cubes 24 simulate electro-mechanical equipment which detect analog signals from changing environmental conditions such as fluid flow, fluid and gas pressure, temperature or amperage. The sensor cubes 24 serve to transmit information regarding the particular environmental condition via analog signals to the computer. The computer software program is designed to provide digital control via the interface relay cube 25 to various control systems, such as a heating system depending upon the environmental conditions perceived by the remote sensor cubes 24. The instructor is thus able to program the various control systems to teach students the basic processes of computerization from the programming standpoint. Using the microprocessing system 20 with additional electro-mechanical cubes 42, as shown in FIG. 1, the students learn additional troubleshooting and operational techniques of the control systems as they are regulated by the computer.

The Microprocessing CPU

As mentioned, heating, cooling or other control systems typically function because of the existence of some environmental condition based upon analog measurement. For example when the temperature drops below a particular set point, measured by the thermostat, simulated by the thermostat cube 128, in a building, its heating system is designed to come on. Similarly when a variance in electrical amperage exists, a power supply may be designed to shut down or start up depending on the required function. Difference in gaseous pressure or fluid flow are other examples of analog measurements which regulate control systems.

The microprocessing CPU 21 or central processing unit receives analog signals from the remote sensor cubes 24, processes them and then determines by its software programs the proper sequence and timing of operating the various control systems.

As shown in FIGS. 1 and 2 of the drawings, the preferred embodiment of the CPU comprises a rectangular structure having a front panel 27 with a plurality of input and output jacks. Two disk drives 26 operate like conventional drive systems in a small computer and run standard floppy disk software. A key switch 29 provides locked access to the CPU.

The CPU contains three microprocessing chips represented by boxed letters A, B and C as shown in FIG. 4 of the drawings. Conventional computer hardware is contained in the CPU. This computer equipment of the present embodiment is IBM compatible whereby the same software programs may be used and run on the CPU 21. A graphics card and printer interface are also designed within the circuitry of the CPU (not specifically shown by the drawings).

The preferred embodiment of the CPU contains four analog inputs, as shown as input jacks 1 through 4 in FIG. 2, to be externally wired to remote sensor cubes 24. The CPU is thus designed to simulate a working processing unit or computer which can sense four different locations and conditions changes in a particular working environment, i.e. room temperature in one location, amperage drawn by a series of machines in another location, etc.

Twelve output channels 200, shown as output jacks 200, shown in FIGS. 1 and 2 provide the DC signal to control the AC voltage of the various control systems represented by electro-mechanical cubes 42. The software used in the CPU 21 is programmed for the various channels to provide electrical output to its corresponding control system cube 42 at preselected times or on certain increase or decrease of temperature, amperage, etc. Examples of typical operation of the microprocessing system will be discussed further below.

A plurality of external switches 202 are provided on the CPU, four such switches being shown in the preferred embodiment in FIGS. 1 and 2. These switches 202 represent a capability of being able to override the computerized system or otherwise provide a digital switching capability which may be programmed for in the software. An example of external switching usages will be described below.

Internal control switches 204 shown in FIG. 2 are identified by internal controls and letters A, B, C and D on the panel 27. These internal control switches 204 may be used by the instructor to alter the sequence of the computerized control process or enter a fault into the system which the students must locate. Activating one of these switches will enter the preprogrammed change or fault into the system and eliminate the necessity for having to access the software or rewrite the program each time the fault is desired to be used. If the switch is not activated the system will operate normally.

As previously discussed, three microchips are utilized in the CPU and are shown in wiring schematic diagrams in FIG. 4 of the drawings. Microchip A contains output channels 1 through 6, chip B contains output channels 7 through 12 and chip C contains circuitry for the internal control switches.

Figure 4A:
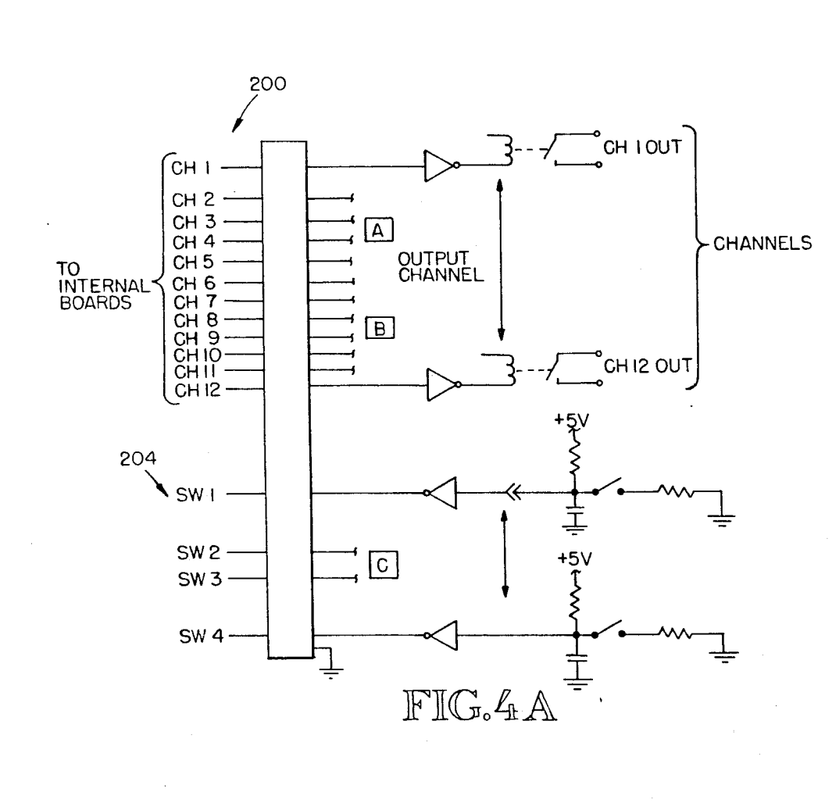
FIG. 4 is a schematic diagram of the electrical circuitry of the CPU and microprocessing system.

The three microchips represent the internal and newly designed circuitry for the CPU not found in conventional computer hardware circuitry. The digital input and output functions contained in the three chips are illustrated in 4A of the drawings.

In the preferred embodiment of the CPU, the analog input sensors as well as the external digital input switches are electrically connected to the graphics circuitry (not shown) which could be used with conventional computer hardware. The graphic circuitry or graphics "card" is a conventional circuit board and not particularly developed for the functions of the CPU. This graphics card might normally be used to control the joy stick (analagous to the signals of the analog sensor circuitry) and trigger buttons (analagous to digital external switch signals) in a conventional video game.

Figure 4B:
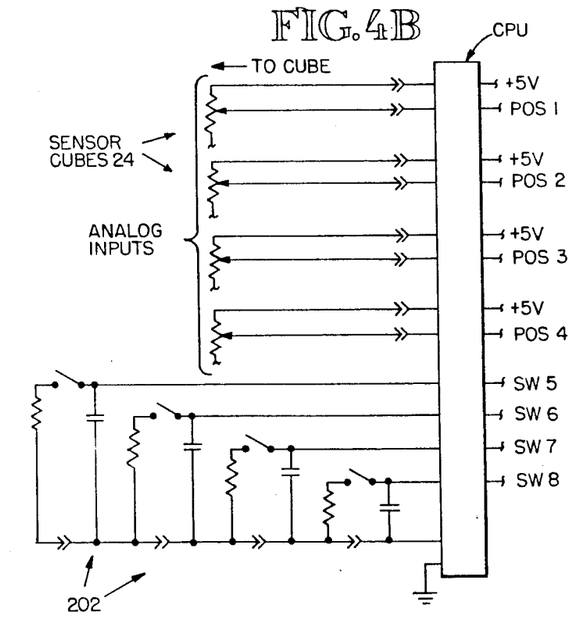

FIG. 4B illustrates the analog inputs and external switches which are operated through external means, i.e. cubes or external switches rather than involving completely internal circuitry.

Figure 4C:
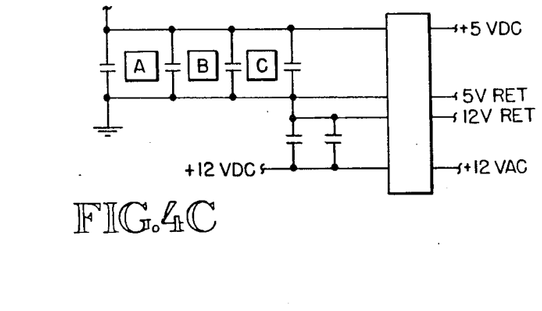

FIG. 4C illustrates the power supply to the three microchips from the transformed 5 volt DC power of the CPU.

Power is supplied to the CPU through conventional outlet means or may be plugged into the back of the hollow structural power base 44 upon which the CPU is supported. As with conventional computers, the line in AC power to the CPU is converted to five volts of DC output current and transmitted via the twelve output channels 200 of the CPU.

Figure 3:
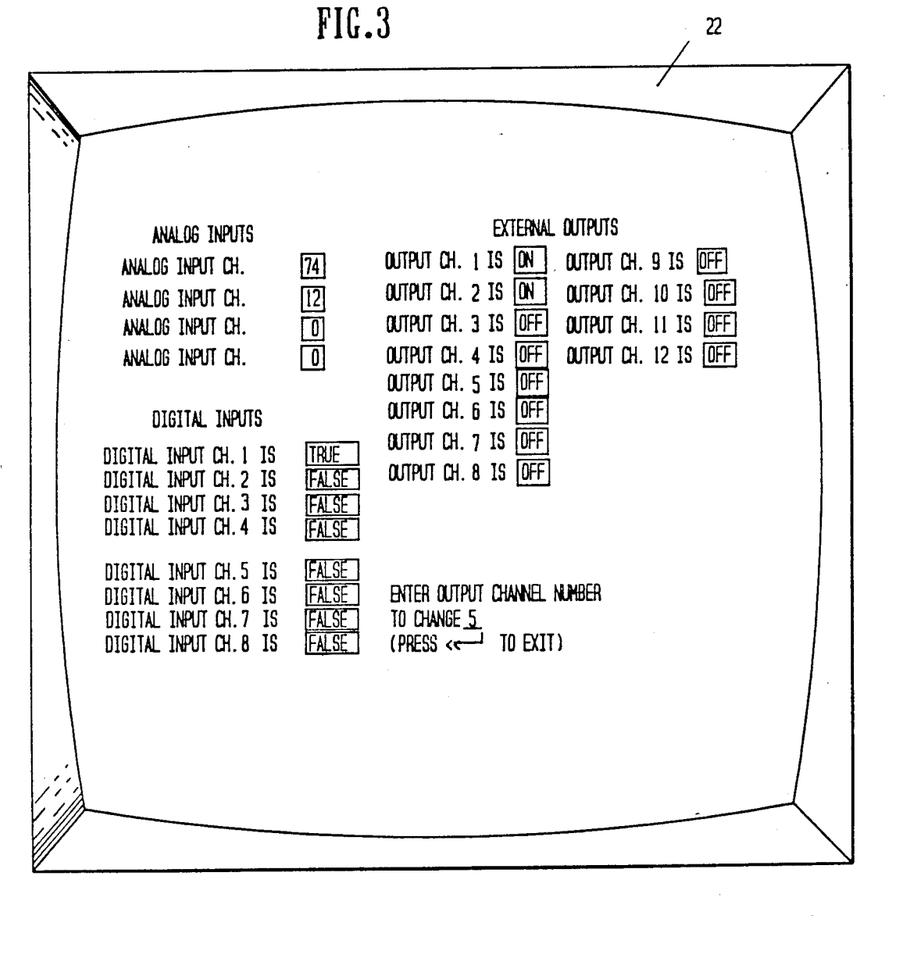
FIG. 3 is a front view of the screen.

The viewing screen 22, shown in FIGS. 1, 2 and 3 of the drawings provides the user to read the analog and digital data supplied from the sensor cubes 24, output channels 200, external switches 202 and internal control switches 204 respectively. The screen 22 is preferably adapted as an electro-mechanical cube 42 having electrically conductive feet 50 positioned into receiving apertures 60 on top of the CPU 21 to make an electrical connection. In this way the screen operates similarly to the other electro-mechanical cubes 42 in the system which will be discussed further. The screen may comprise a conventional screen monitor used with many typical personal computer systems and plugged into the CPU with its outlet cord.

A standard typewriter like keyboard 23 is used as a conventional computer keyboard for programming and operating the microprocessing system. The keyboard 23 is shown in FIG. 1 of the drawings.

Programming and Developing Lesson Plans for Students Using the Microprocessing System As previously discussed the CPU, keyboard and screen are the three minimal components of the microprocessing system which the instructor will need to develop software programs and laboratory course work for the students to teach the computerization of heating, cooling, ventilation or other electrical control systems. The programs are designed to be menu driven to allow the instructor to insert the necessary information necessary for the computer to regulate when and where certain controls in a system will operate. The instructor for example, may enter the desired temperature set point in the software program. He may then indicate a higher temperature at which a preselected channel 200 will be used to send the output signal to turn on a fan (represented by an electro-mechanical cube). The temperature parameters, particular electro-mechanical cubes, channels, set points, etc. are selected by the instructor and entered into the menu of the software program. The software available to the instructor provides the source program which will ask the instructor to enter this data to complete the program. Each new program the instructor will write will comprise one of many lesson plans to have the student learn more about the programming aspect of the computerization of control systems.

As the instructor runs the software program, he will see the data provided on the screen 22, shown in FIG. 3. If the desired set point temperature is 68 degrees for example, sensor number one 30 may be reading an analog input of 74 degrees from the sensor cube 24. As the computer program has determined that once the temperature exceeds the set point, the output channel 200 is activated and the output DC signal is sent from output channel 1 to the particular apparatus represented by the electro-mechanical cube, such as a fan to decrease the temperature. As shown on the screen, output channel 1 is on or activated in this situation. If the instructor has entered a fault into the system, he may have activated internal control switch A (shown by input channel 1 in FIG. 3) whereby the indicator would read true for channel A.

The basic computer related components of the microprocessing system 20 provide a self contained teaching apparatus. Students may learn programming and use of a computerized energy control system in this way. The addition of various switching, sensory and other electro-mechanical cubes representing equipment provide the student with a broader education as to the operation and troubleshooting of control systems, including their microprocessing components seeing the programs function with working results.

The Microprocessing System is Designed to Function as a Component of the Modular Training System Relating to Electro-Mechanical Control Systems Developed in U.S. patent application Ser. No. 666,977 now U.S. Pat. No. 4,623,312.

The microprocessing system is preferably designed to function in combination with and as a component of a changeable modular control training system used by instructors to train students, technicians or engineers in the installation, servicing, troubleshooting and operational procedures for mechanical and electrical control systems used with various kinds of machinery, refrigeration, heating or ventilation systems and the like. Using the computer programming capabilities, the instructor and students may explore a variety of ways to regulate the operation of these control systems as would be found in a typical working environment. This electrical and mechanical equipment, represented by cubes 42, may be programmed to be turned on or off at predesignated times, heating or cooling systems may be programmed to operate based upon the relationship of sensory data as it relates to each other, such as internal temperature versus external temperature of a building and so forth. The student is thus provided with hands on training ability in developing, operating and troubleshooting both the computerization and the electromechanical operation of the control systems.

Figure 5:
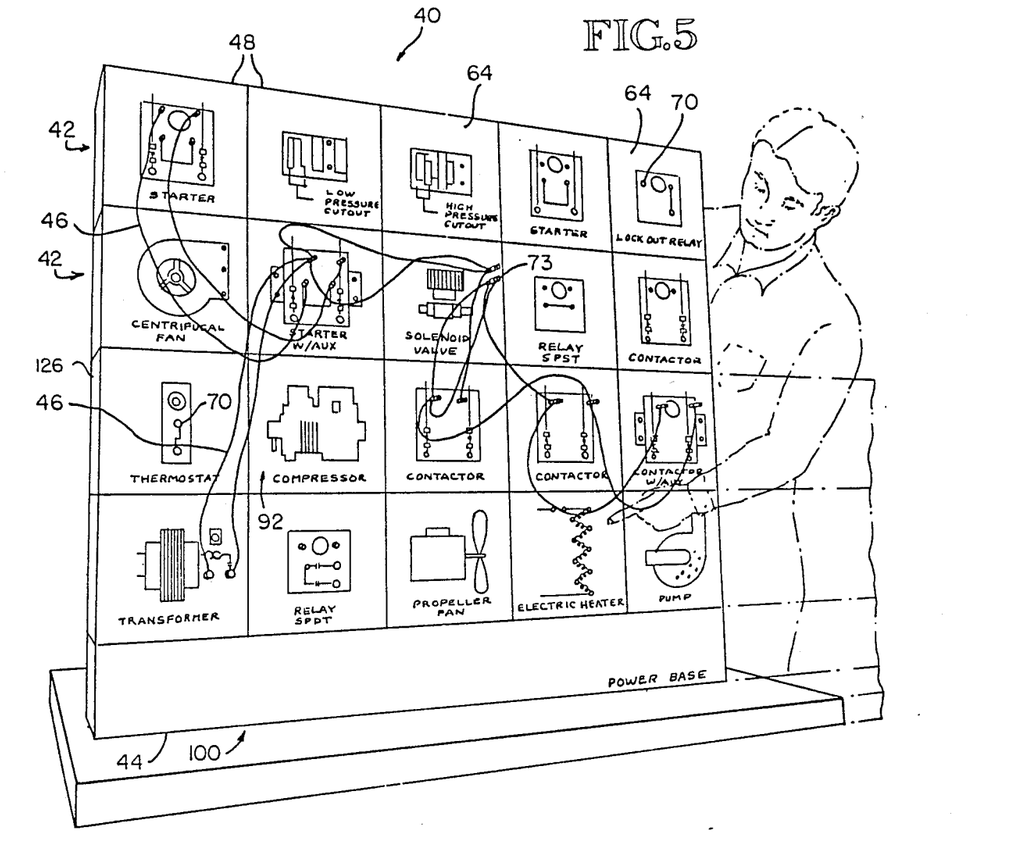
FIG. 5 is a perspective view of an alternative embodiment of the modular training system without the miroprocessing system.
Figure 6:
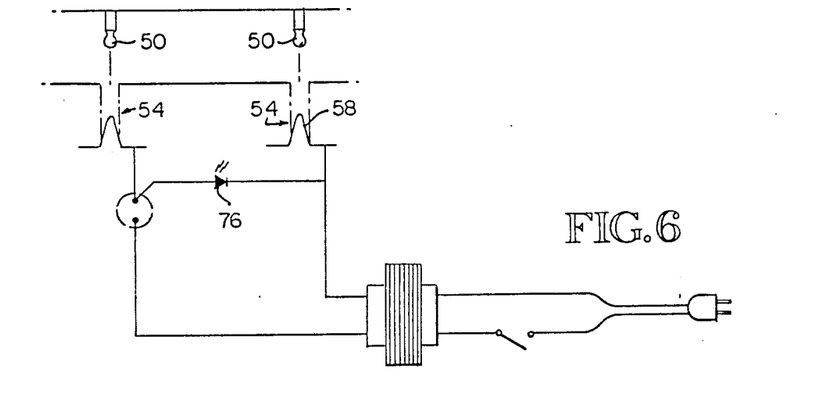
FIG. 6 is a schematic diagram of the mechanical and electrical connection of the power base with a cube or the CPU.

As shown in FIGS. 1, 2 and 5, the CPU and screen are preferably adapted to be supported and electrically connected to a hollow structural power base 44.

Figure 9:
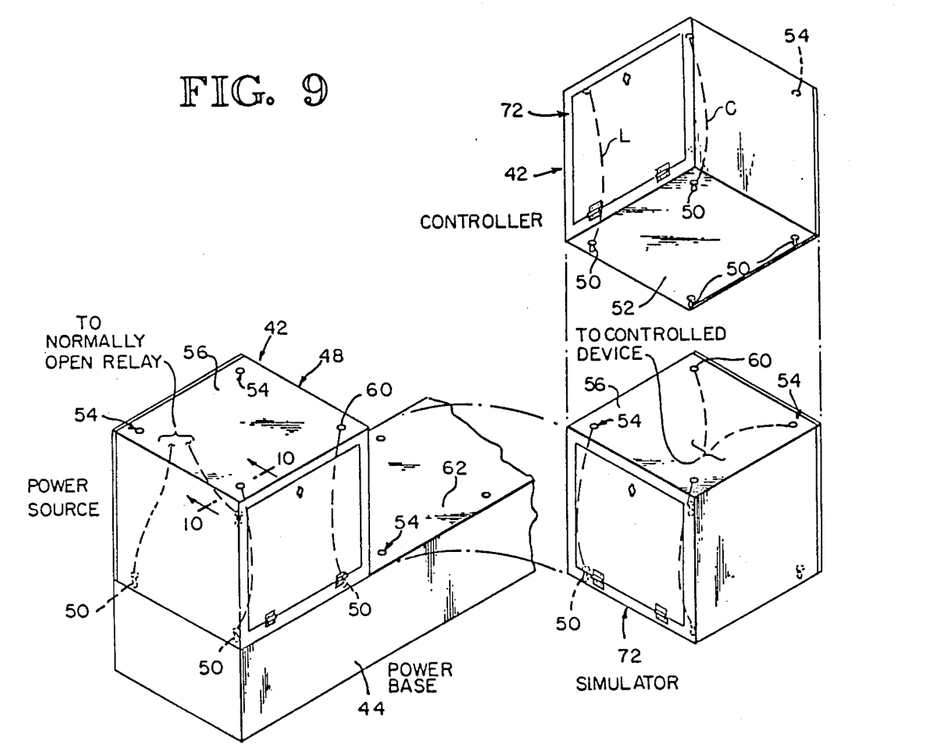
FIG. 9 is an exploded view of the interconnection of cubes with the power base indicator light power circuitry.

The power base 44 provides the source of reduced voltage electrical power for the system as well as a mounting apparatus for the cubes 44. The power base comprises an elongated rectangular hollow enclosure 100 having a plurality of sets of four mechanical electrical connectors 54 spaced apart within apertures 60 on its top surface as shown in FIG. 9. The connectors 54 are internally wired within the power base 44 and adapted to receive the feet 50 of the cubes and provide electrical contact as well as a structurally supportive connection for the cubes 42.

The screen 22 is preferably adapted to be positioned on top of the CPU 21 although it may be placed directly on the power base 44 or on another electro-mechanical cube. Source power to operate the screen is provided by external connection to standard or 110 AC power. The screen cube is however wired internally to complete indicator light power circuitry as will to be discussed later.

The other cubes, including the screen, are adapted for removable and optional mounting either to the top of the power base, on top of the CPU or on top of another cube, selectably arranged in building block fashion as shown in FIGS. 1 and 5. Corresponding and like mechanical-electrical connectors (not shown in the drawings) comprise receiving apertures in the top surfaces of the cubes, the CPU and the power base.

Figure 7:
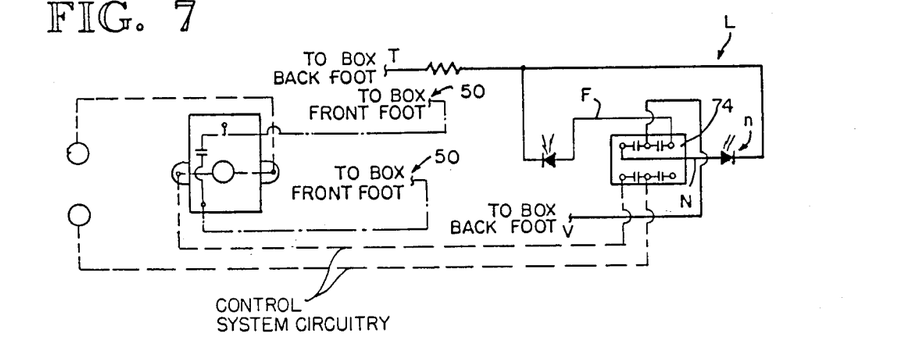
FIG. 7 is a schematic diagram of the electrical circuitry within a cube including indicator light power circuitry and control system circuitry.
Figure 8:
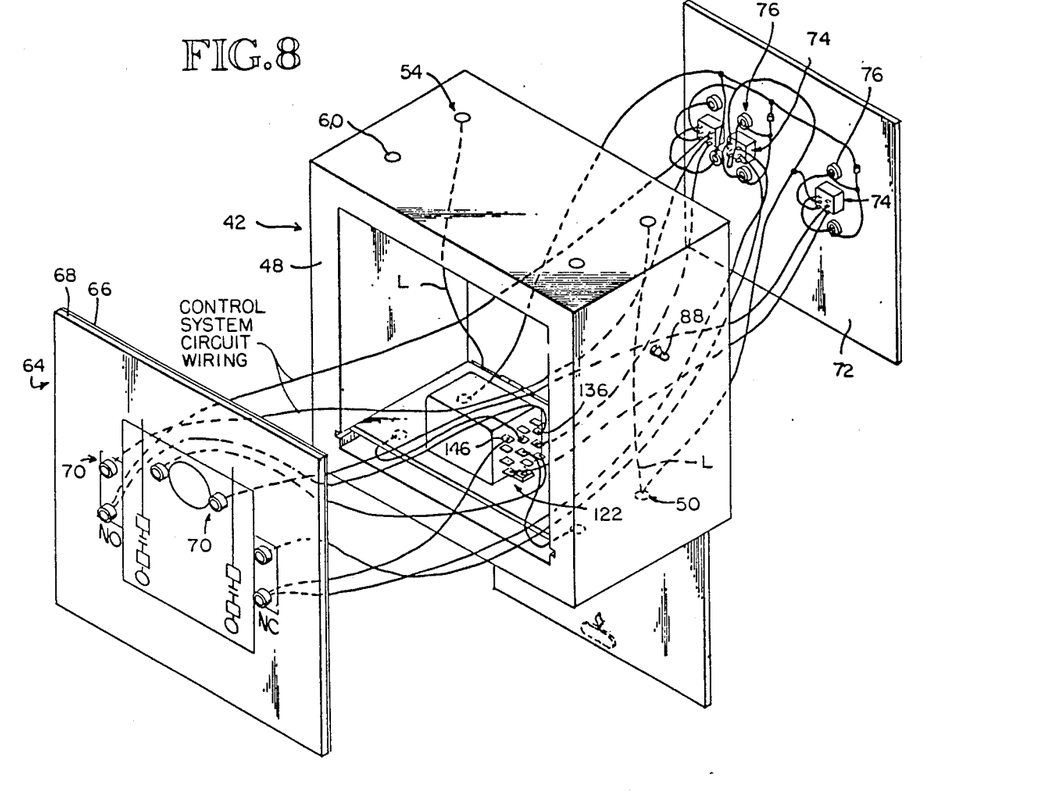
FIG. 8 is an exploded view of the internal components and wiring of a cube.

All electro-mechanical cubes including the screen are internally wired through the feet and connectors to supply indicator light power circuitry to the system derived from the power base. The CPU, as referenced above, derives its power preferably through an outlet cord being plugged into the back of the power base or may be plugged into a standard wall outlet. The DC indicator light power is thus transmitted internally through the cubes to allow indicator lights 76, indicating a fault, to be activated or to allow for the simulated function of a particular cube to be shown, such as a moving fan or turning motor, etc. Control power circuitry, by contrast, is internally wired by the instructor or student within the cubes and its circuits are completed by using the patch cord connecting wires 46 plugged into the terminals 70 on the face of the cubes 42 and the panel 27 of the CPU 21 as shown in FIGS. 1, 2 and 5 of the drawings. Wiring for indicator light circuitry L is shown in FIGS. 7 and 8.

As shown in FIG. 2, a remote cube is added to the system to provide simulation of temperature change for example. The preferred embodiment of the CPU contains four sensor inputs 30 though additional capacity for sensors is possible. One sensor cube 24 may represent temperature change while another sensor cube can be used for measuring amperage differential and so forth. Each sensor cube will thus be used to provide data to the computer in the CPU to access operation of a control component, such as a fan or a thermostat, at the preprogrammed sequence via the output channels 200 on the CPU 21. The output signal from the various channels 200 exists as five volts of direct current. An interface relay cube 25 is required as a switching means for the DC output signal to control the AC power requirement of the particular electro-mechanical cube 42 representing the component in the control system, such as the thermostat, heater or contactor shown in FIG. 2. One interface relay cube is thus required for each output channel.

Similarly to the other cubes, the remote sensor cubes 24 and interface relay cubes 25 comprise actual working electro-mechanical equipment. In the case of the interface relay cube, an actual relay switch is used. Additional information regarding the internal construction of the cubes 42 is described below.

As discussed, completion of the control power circuits between the remote sensor cubes and the sensor outputs on the CPU are completed with patch cords 46 as are the circuits between each output channel 200 and its corresponding interface relay cube 25. These connections merely provide an additional link to the overall network of control power circuitry established for the training system that the student must contruct and later troubleshoot during instruction. The four external switches 202 on the CPU may be activated by patch cord connection to the external jacks to simulate a toggle switch, sensory light cell or other device which provides a digital signal to interrupt the preprogrammed sequence of operation of the control systems. Use of the microprocessing system with other cubes in the modular training system allows the student to see the end result of the computerized control operations. The software may be programmed to speed up the process of control system operation from the typical hourly or daily normal sequence to a matter of minutes. Some typical lessons utilized by the instructor include operating and troubleshooting a demand limiting system, a reset schedule or monitoring process for various control systems, described later.

The Non CPU Related Cubes of the Training System are Broadly Referred to as Source Cubes, Simulator Cubes and Controller Cubes In general each cube 42 includes various conventional electrical and mechanical components, such as motors, relays, thermostats and circuit breakers, mounted inside of it and represents a component of a typical electro-mechanical control system. The cubes 42 are adaptably wired internally to receive and transfer electrical power from the power base 44 to other cubes (indicator light power circuitry) as well as to be wired together externally with control circuit patch cords 46 (control system circuitry) as shown in FIG. 1. The cubes 42 are alternatively stacked on the power base 44 or on top of each other to form the desired arrangement of components of an operable electro-mechanical control system.

The non CPU related cubes however broadly comprise simulator cubes, such as a compressor; heater or fan; contactor or starter cubes; a transformer cube and control cubes, such as a thermostat, valve or flow switch. An arrangement of this embodiment of the modular system without the microprocessing system is shown in FIG. 5.

External wiring of the cubes to each other establishes the desired control system circuitry designed by the instructor. The student may be asked to construct the required system by assembling the cubes 42 and wiring them together rather than the instructor doing it. In such case, the student must establish the correct wiring sequence to complete an instructor designed control system circuit thereby learning installation of a control system typically found at a job site.

Each cube 42 is adapted to simulate control system failures by faults being entered to the system by the instructor. Using conventional testing equipment, such as a voltmeter, the students determines where faults in the control system are located by systematically checking the wiring sequence and cubes 42 thereby learning troubleshooting and maintenance techniques similar to those encountered in the field.

The cubes of the modular training system 40 are designed to represent actual electro-mechanical components within an operable electrical control system. The components include simulated operable equipment or machinery as well as the various electro-mechanical controlling elements which allow the equipment to perform its various functions, according to the requirements of the system, as would be found at a real job site. Some cubes, such as a relay control cube, include a conventional electromechanical component inside, such as a contact relay. Other cubes, such as a remote thermostat control cube 126, utilize switching means inside the cube to simulate the operation of the electrical component, such as a thermostat, often referred to by instructors as a stat.

Figure 10:
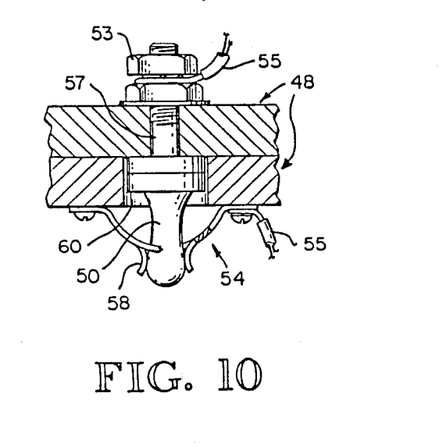
FIG. 10 is a sectional view taken from line 10—10 of FIG. 9, being enlarged to show the connection of the foot of a cube with a receiving aperture.

The cubes 42, shown in FIGS. 8 and 9, each comprise a hollow enclosure 48 which is preferably rectangular shaped and made of wood or a composite material and have a durable exterior surface, such as formica. Mechanical electrical connecting feet 50 depend from each of the four corners of the bottom surface 52 of each cube adjacent to each of four corners as shown in FIGS. 9 and 10. FIG. 10 shows a foot 50 secured to the hollow structure 48 with threaded nuts 53. A wire lead 55 from the cube circuitry is electrically connected to a shaft 57 which is in turn secured to the foot 50. Corresponding and like mechanical electrical connectors 54 are adaptably mounted below the top surface 56 of each cube 42 adjacent to each of the four corners to each receive a foot 50 as shown in FIGS. 9 and 10. The connectors 54 of each cube include detent spring latches 58 which may securely receive connecting feet of another cube mounted on top of it, shown in FIG. 10. Electrical connection is made with a wire lead 55 secured to the spring latch 58. The connectors 54 are accessible through apertures 60 on the top surface 56 of the cube 42 as shown in FIG. 9. Like mechanical electrical connectors 54 are also correspondingly positioned at the top surface 62 of the power base 44. Selected cubes 42 may be then interchangeably plugged into the power base 44 with other cubes 42 thereafter being stacked on top of the first cube 42 as shown in FIGS. 1 and 5. The coupling of the feet 50 and connectors 54 provides combined mechanical electrical connection of the cubes 42 to the power base 44 and to each other. In addition to providing structural support for the cubes 42 when stacked, the feet 50 of a cube inserted into connectors 54 of another cube or the power base establish and continue power for the system, comprising an electrical indicator light power circuit (shown by solid lines in schematic diagrams of FIG. 7 and indicated generally as L) from the power base through the cubes as shown in FIG. 9.

A face plate 64 is secured to the front of each cube 42 with conventional fasteners 65 and includes a pictorial diagram identifying the particular electrical component represented by the cube 42. The face plate 64 preferably comprises an appropriate pictorial diagram sheet 66 secured to and displayed behind a Plexiglas cover 68 as shown in FIG. 8. The face plate 64 may alternatively be formed from a single piece of material, using a painted or color plastic diagram display for example.

Color coded electrical terminals 70 are internally wired in the cube and extend through the face plate 64 as shown in FIGS. 1, 4 and 14. The terminals 70 are adapted to receive male wire plugs 72 of the control circuit patch cords 46 and allow the cubes 42 to thus be externally wired together to complete the electrical control circuits of the system designed by the instructor. Rear panels 72 encloses the back of each hollow enclosure 48 also shown in FIG. 8.

Utilization of the Microprocessing System as Components of the Overall Modular Training System As shown in FIGS. 1 and 2 of the drawings, the combination of the CPU with sensory, interface and electro-mechanical cubes simulates a field environment typically found in an industrial complex or other commercial setting. Computers are typically used to electronically control new or existing electrical mechanical heating, cooling, ventilation or similar systems. In FIG. 2, the cubes are arranged to illustrate the microprocessing system being used to activate or deactive the heater in the training system depending upon temperature variation read by the remote sensor cube 24. The set point temperature is established in the computer program software. The remote sensor cube 24, used to detect temperature differential, is externally wired to the number one sensor input 30 while the output channel one is externally wired to the interface relay cube 25 shown in the drawing. A thermostat 126, contactor 210, transformer 212 and electric heater cube 214 are wired in series and connected to the AC side of the relay switch in the interface relay cube 25. This arrangement will allow the interface of the computerization with the normal function of the heat control system.

If the remote sensor cube 24 is adjusted below set point, the analog signal is received by sensor channel number one in the CPU 21. The computer program determines that below set point a DC signal should be sent from output channel one to the DC terminals of the interface relay. This results in the closing of the AC side of the relay switch which in turn activates the transformer 212 sending AC power to close the contactor 210 and thus activate the electric heater through line power (internally wired) between the contactor 210 and electric heater cubes 214. In contrast, if the remote sensor is adjusted above set point, the program determines that the output signal should be interrupted, thereby opening the interface relay switch which in turn breaks the circuit to the transformer 212 and thereafter the contactor which results in the heater 214 being turned off.

The application of the microprocessing system merely adds additional capability of controlling the heating control system. The thermostat cube 126 may also function in this manner to regulate the operation of the electric heater. A variety of control cubes may be used to determine the timing and sequence of operation of simulators, working alternatively to or preferably in conjunction with the microprocessing system as illustrated in FIG. 2. In this case, the thermostat cube may be used as a safety measure in case of a failure in the microprocessing system. More will be discussed about programmed faults and failures in the system subsequently.

Another situation requiring a single sensor is the simulation of a demand limiting system often required for energy conservation. A maximum amperage load required by startup of compressors, for example, may be established as the set condition in the CPU's software. The software may be programmed further to shed usage of other electrical equipment on a priority of use basis when the amperage load is reached so as not to exceed the set point. The remote sensor cube thus senses the increase in amperage, conveying this analog data to the sensor switches in the computer. The output from various channels results in signals to shut off various pieces of equipment as instructed by the program when the amperage level is at or exceeded.

Other examples of computerized control, not shown in the drawings, include a reset schedule being developed would be when a boiler is required to heat water to a specific temperature or specific and corresponding outdoor air temperature. In this case, two remote sensor cubes 24 are used, one simulating the reading of water temperature while the other reads outdoor air temperature. The computer program is designed to compare the outdoor air temperature and water temperature to determine whether the output channels should signal the boiler to be turned on or shut off.

Similarly, a floating warmup period may be used in buildings where one sensor cube 24 reads the outside air temperature while the other reads the inside air temperature. A computer program is designed to compare these temperatures and thus determine how long heaters must come on prior to the building being open for business in the morning such that it is warm enough for the workers when they arrive.

Sensors or sensor cubes for training purposes, may also be used to simply monitor differences in temperatures in different zones of a building, water temperatures in the boiler, amperage variation of electrical machinery, etc. The user will thus be able to keep track of various conditions to insure that the control systems operate properly.

Figure 11:
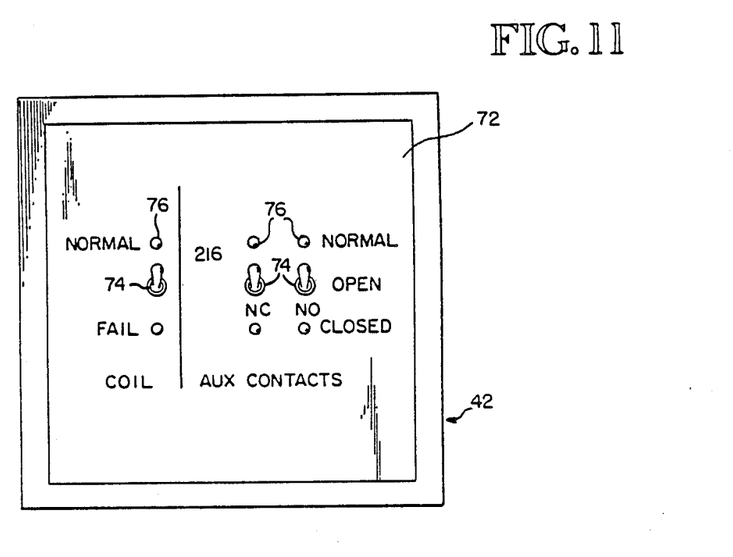
FIG. 11 is a rear view of a cube including the rear panel and fault selection switches.

Faults or Failures in the Control System Circuits May be Entered by the Instructor to Provide Troubleshooting Problems for Students, and are Classified as Source Power, Resistance or Switching Failures as Well as Software Programming or Other Computer Hardware Failures By manually operating the fault selection switches 216 on the rear panel 72 of the cubes, the instructor, for example, may alternatively enter or remove a variety of failures in the control system circuits that will serve to create troubleshooting problems for students to determine, shown in FIG. 11. These failures may be classified as a lack of source power, a failure switch or a resistance failure.

Source power may be determined by visually observing the primary line in power cord of the power base as well as the power switch and circuit breaker on the power base to determine whether these switches are merely turned off. Likewise the power to the CPU may be visually checked through its power cord. Each cube is additionally provided with a fault selection switch 72 which when set to the fail position indicates a resistance failure indicating inoperable electro-mechanical equipment, such as burned out secondary windings in a holding coil cube for example as shown in FIG. 11. This resistance failure would thus open the circuit in the control system circuitry which would be detectable through the use of ohmmeters or voltmeters or other conventional testing equipment. Switching failures may also be determined whereby a switch is failed in the open or closed position. Each of the remote sensory cubes and interface relay cubes may be faulted to indicate an electrical mechanical problem as well. As with the other electromechanical cubes, a fault selection switch on the back of the sensor cubes 24 and interface relay cubes 25 may be operated by the instructor, such as faulting the interface relay or the sensor in the open position. Students are again required to use conventional testing means, such as using a DC ohmmeter across the terminals of the sensor cube. Using specifications provided by the manufacturer of the sensor (in this case by the instructor) the student will obtain the data regarding corresponding temperature and resistance. The sensor is turned to its set point, such as 72 degrees, and the measurement is taken to determine whether the sensor is operating properly.

In addition to the source power, resistance or switching failures, the microprocessing system provides for failures in the CPU or the software itself.

The instructor may have programmed a fault into the software whereby an internal control switch may be used to enter the programmed fault into the sequence of control operation. When completing the program, the instructor will complete the information requested by the menu driven software, i.e. what problem will be entered when the internal control switch is manipulated. An example would be that no response would result when the temperature exceeded a set point in the program. If the internal control switch 204 were not activated, the program would continue normally whereby as the temperature exceeded the set point, a fan would be turned on.

The purpose of this invention is not to explain computer repair technique nor is it the function of this application to discuss any of the internal operating functions of the computer itself. Suffice it to say that the student may use a process of elimination in determining whether a fault in the system is derived from an electro-mechanical cube, from the sensor or interface relay cubes or from the software/computer components of the system. Most of the electro-mechanical problems may be corrected by the student while certain software or computer hardware related problems probably cannot.

I claim:

1. An energy management microprocessing changeable modular training system to prepare persons for their energy operational management of buildings, comprising:
    (a) a power base;
    (b) an energy management microprocessing interface unit positioned on the power base;
    (c) a keyboard removably attached to the said energy management microprocessing interface unit;
    (d) a video screen positioned on the energy management microprocessing unit;
    (e) a remote sensor positioned on the energy management microprocessing unit;
    (f) a microprocessing interface relay positioned on the energy management microprocessing unit; and
    (g) selected modules electro-mechanically secured to the power base, each containing a selected actual component, or a selected simulated component, to create a representative arrangement of electrical components, electro-mechanical components, or electrical-electronic components, or electrocoupled sensing components used in the operational maintenance of a building; and
    (h) selected external electrical or electronic circuit wires for interconnecting selected modules, and interconnecting the energy management microprocessing unit with the said remote sensor and the said microprocessing interface relay;
    wherein each:
        (1) said module is multi-sided, including first electrical connector means on one side for jacking said module into the said power base or a second module for supplying power thereto;
        (2) said module includes a second electrical connector means on a second side thereof opposite said one side for jacking said module into a second module and for supplying power thereto;
        (3) said module comprises a receptacle having a selected type of an electrical based component mounted therein;
        (4) said electrical based component has leads electrically connected to at least one of said first and second electrical connector means;
        (5) said module includes electrical display means on the third side thereof;
        (6) said electrical component has leads connected to said electrical display means;
        (7) said module includes operator control means on a fourth side thereof;
        (8) said electrical component has leads connected to said operator control means; and
        (9) said first and second electrical connector means also provides vertical structural support for the modules when stacked on said base;
    and wherein
        (1) the power base including means to receive high voltage electrical power and converts and distributes such power at a lower voltage to the said modules, via the control of the microprocessing interface relay;
        (2) the energy management microprocessing unit is used during the analysis of analog sensory input data coming from the remote sensor, and during the processing of this said data, includes means to provide a low voltage electrical digital output to the microprocessing interface relay, which in turn controls the distribution of low voltage from the power base to the said modules; and (3) said keyboard includes means to receive the commands of the operator in directing the operations of the energy management microprocessing unit.

* * * * *